United States Patent
Chang et al.

(10) Patent No.: US 8,321,379 B2
(45) Date of Patent: Nov. 27, 2012

(54) SYSTEM METHOD AND APPARATUS FOR OPTIMAL PERFORMANCE SCALING OF STORAGE MEDIA

(75) Inventors: Jean R. Chang, Santa Clara, CA (US); Kirby Grant Dahman, Tucson, AZ (US); Erika Marianna Dawson, Tucson, AZ (US); Stanley Mark Kissinger, Tucson, AZ (US); Gavin Stuart Johnson, Aromas, CA (US); Jon Arthur Lynds, San Jose, CA (US); Michael Ray Noel, Tucson, AZ (US); Linda Jean Schiltz, Flagstaff, AZ (US)

(73) Assignee: International Business Machines Corporation, Armonk, NY (US)

( * ) Notice: Subject to any disclaimer, the term of this patent is extended or adjusted under 35 U.S.C. 154(b) by 1709 days.

(21) Appl. No.: 10/648,064

(22) Filed: Aug. 26, 2003

(65) Prior Publication Data
US 2005/0050055 A1    Mar. 3, 2005

(51) Int. Cl.
*G06F 17/30* (2006.01)
(52) U.S. Cl. .......................... 707/654; 707/655; 707/666
(58) Field of Classification Search .................. 364/200; 360/72; 711/114, 111; 700/159; 375/150; 707/654, 665, 666, 655
See application file for complete search history.

(56) References Cited

U.S. PATENT DOCUMENTS

| | | | |
|---|---|---|---|
| 4,092,679 A | 5/1978 | Sander | 360/71 |
| 5,018,060 A * | 5/1991 | Gelb et al. | 707/205 |
| 5,757,571 A * | 5/1998 | Basham et al. | 360/72.1 |
| 6,031,798 A | 2/2000 | James et al. | 369/34 |
| 2002/0159546 A1* | 10/2002 | Fulghum et al. | 375/341 |
| 2003/0120379 A1* | 6/2003 | Mehlberg et al. | 700/218 |
| 2003/0193994 A1* | 10/2003 | Stickler | 375/150 |
| 2003/0204672 A1* | 10/2003 | Bergsten | 711/114 |

OTHER PUBLICATIONS

Erik Riedel, Garth Gibson and Christos Faloutsos, "Active Storage for Large-Scale Data Mining and Multimedia", Proceedings of the 24the VLDB Conference, New York, 1998.*

* cited by examiner

*Primary Examiner* — Phong Nguyen
*Assistant Examiner* — Dennis Myint
(74) *Attorney, Agent, or Firm* — Kunzler Law Group PC

(57) ABSTRACT

An apparatus, system, and method are presented for scaling storage media to improve data access performance. A scaling module is provided and configured to receive a dataset, identify storage characteristics of the dataset, make a determination based upon user-defined storage criteria, and select a storage instruction. In one embodiment, the storage instruction is configured to scale the storage medium to a predefined capacity. The predefined capacity of the storage medium is configured to optimize data access performance. Alternatively, the storage instruction is configured to not scale the storage medium. Additionally, the present invention may be configured to map and track the storage medium while the dataset is being written to or read from the storage medium.

15 Claims, 5 Drawing Sheets

SYSTEM METHOD AND APPARATUS FOR OPTIMAL PERFORMANCE SCALING OF STORAGE MEDIA

BACKGROUND OF THE INVENTION

1. Field of the Invention

This invention relates to storage media and more particularly relates to scaling a tape storage medium to improve data access performance in a tape storage system.

2. Description of the Related Art

Every new generation of tape storage technology is increasing the capacity of tape storage products that are available. The total storage capacity of a tape depends on many factors, including the physical dimensions of the tape, the data compression, if any, used to write data to the tape, the number of tracks across the width of the tape, and so forth. Another factor that may distinguish physical capacity from usable capacity is that the usable capacity is often defined to be slightly less than the physical capacity. This is due, in part, to servo tracks, data block headers, and other metadata blocks throughout the tape.

As total tape storage capacity increases, however, so too does the time required to access data on a tape. For many data storage uses, such as a data backup, longer access time to the data is acceptable. However, many other data storage applications would benefit from faster data access times even though tapes of greater capacity are used in the storage system.

For tape storage applications, data is typically stored onto a magnetic tape medium, such as a metallic ribbon, within a tape cartridge using a tape drive. The tape medium conventionally is designed to include a plurality of tracks that are distributed across the physical width of the tape medium and run the physical length of the tape medium. A tape write head within the tape drive is typically capable of writing up to sixteen tracks at one time, starting at one end of the tape and moving along the length of the tape. When the tape write head reaches the end of the tape, the head is aligned over the proximate track set, the direction of the tape is reversed, and the write head writes an additional sixteen tracks in the opposite direction. This "serpentine" pattern may continue until all tracks have been written.

The process for reading data from the tape medium is essentially the same. A tape read head moves across the tape medium and reads sixteen tracks from one end of the tape medium to the other. The tape read head then realigns to read an additional sixteen tracks and moves over the second set of tracks in the opposite direction.

Given the large capacity of conventional tape storage devices, various data blocks may be stored on a single tape medium. The location of each of these data blocks may be marked on the tape using block header information, data pads (areas of tape where data is intentionally not written), and other conventional identification means and methods. The tape read head is able to locate a particular block of data by using one or more servo tracks that are written onto the tape storage medium.

More recently, manufacturers of tape storage products have directed their attention in part to improving data access time using tape storage drives and cartridges. One method that has been employed to address the problem of increased data access time is to employ various levels of transparent buffering in which tape data may be stored on other storage medium, such as a direct access storage device (DASD) or an optical disk. If the requested tape data is stored on a DASD cache, data retrieval time may be improved greatly. However, the storage capacity of a DASD cache is typically significantly less than that of a con tape storage system. Similarly, the storage capacity of an optical disk is much less than that of a tape cartridge. Currently, technology allows as much as 300 Gb of non-compacted data to be stored on a single, standard tape cartridge compared to approximately 5 Gb of data on an optical disk.

Another method of improving data access time is to segment the tape storage medium into two or more segments and to write data to the segments in a sequential manner. A tape segment may include a specified capacity, or physical length of tape, that is less than the total capacity of the tape. For example, a tape storage medium may be divided into two segments. When writing data to the tape, the data is written to the first segment until full and then to the second segment. This method decreases data access time in that the first segment may be written or read without physically forwarding all the way to the end of the tape storage medium.

Finally, tape storage medium may be scaled to increase data access performance. A scaled tape storage medium is somewhat similar to a segmented tape storage medium in that both storage devices have logically limited capacities to decrease the amount of tape that must be traversed while reading data. The difference between segmented and scaled basically is that a scaled device may only be used to the logically limited capacity and a segmented device may be used to the full capacity of the tape storage medium.

Unfortunately, certain applications are not programmed to realize the benefits of scaling a tape storage medium. The hardware and tape controllers are configured to support scaling, but the applications may not be. In addition, it is desirable to have a predefined capacity that balances the tape media storage capacity and data access performance. Such a predefined capacity may be referred to as an optimal performance capacity. These applications would have to be altered to utilize scaling as well as the optimal performance capacity.

Accordingly, what is needed is a process, apparatus, and system for improving data access performance of a tape storage system using tape media scaling. Beneficially, such a process, apparatus, and system would allow a user to take advantage of the tape media scaling in order to quickly access specified data, and without the added burden of altering each application that uses the tape storage media.

BRIEF SUMMARY OF THE INVENTION

The present invention has been developed in response to the present state of the art, and in particular, in response to the problems and needs in the art that have not yet been fully solved by currently available storage media devices and methods. Accordingly, the present invention has been developed to provide an apparatus, system, and method for scaling tape storage devices to improve data access performance that overcomes many of the above-discussed shortcomings in the art.

The apparatus for scaling storage media to improve data access performance is provided with a logic unit containing a plurality of modules configured to functionally execute the necessary steps of utilizing storage media scaling to improve data access performance. In one embodiment, the present invention includes a reception module configured to receive a dataset for storage on the storage medium, an identification module configured to identify storage characteristics of the dataset, and a scaling module configured to select a storage instruction in response to storage criteria and the storage characteristics.

The storage instruction may comprise an instruction to scale the storage medium to a predefined capacity for optimal data access performance. Alternatively, the storage instruction may comprise an instruction to not scale the storage medium. In one embodiment of the present invention, the scaling module may also comprise a determination module configured to store a plurality of predefined storage criteria and compare the storage characteristics of the received dataset with the predefined storage criteria. Additionally, a mapping module may be provided and configured to track capacity information for the storage medium that stores the dataset. The scaling module may also be configured to communicate the selected instruction to a storage medium controller.

A system for scaling a storage medium to improve data access performance may also be provided. In one embodiment, the system comprises a network configured to communicate data, a storage controller coupled to the network, a storage device having a storage medium configured to store data received from the controller over the network, a host coupled to the network, the host configured to exchange data with the controller, an application operating within the host, the application configured to produce a dataset to be stored on the storage medium, and a scaling module configured to communicate with the application and select a storage instruction in response to storage criteria and storage characteristics of the dataset. Additionally, the scaling module is configured to store a plurality of predefined storage criteria and compare the storage characteristics of the dataset with the predefined storage criteria.

In one embodiment, the storage controller may be configured to receive and execute the storage instruction. In a further embodiment, the scaling module may be configured to operate within the host, the storage controller, or the storage device.

A computer readable storage medium is also provided. In one embodiment, the computer readable storage medium may comprise computer readable code configured to carry out a method for selecting storage medium scaling to improve data access performance. In a further embodiment, the method may comprise receiving a dataset to be stored on a storage medium, identifying storage characteristics of the dataset, determining based on storage criteria whether to scale the storage medium that will store the dataset, and selecting instructions to scale the storage medium according to the determination.

Additionally, the method may further comprise defining a plurality of storage characteristics that cause storage of data on an optimal performance capacity scaled storage medium, or storage on a maximum capacity storage medium. In one embodiment, determining further comprises identifying storage characteristics that satisfy storage criteria for storing the dataset on optimally scaled storage medium. Alternatively, determining may comprise identifying storage characteristics that satisfy storage criteria for storing the dataset on maximum capacity storage medium. In a further embodiment, the method may comprise tracking capacity information for the storage medium that stores the dataset.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
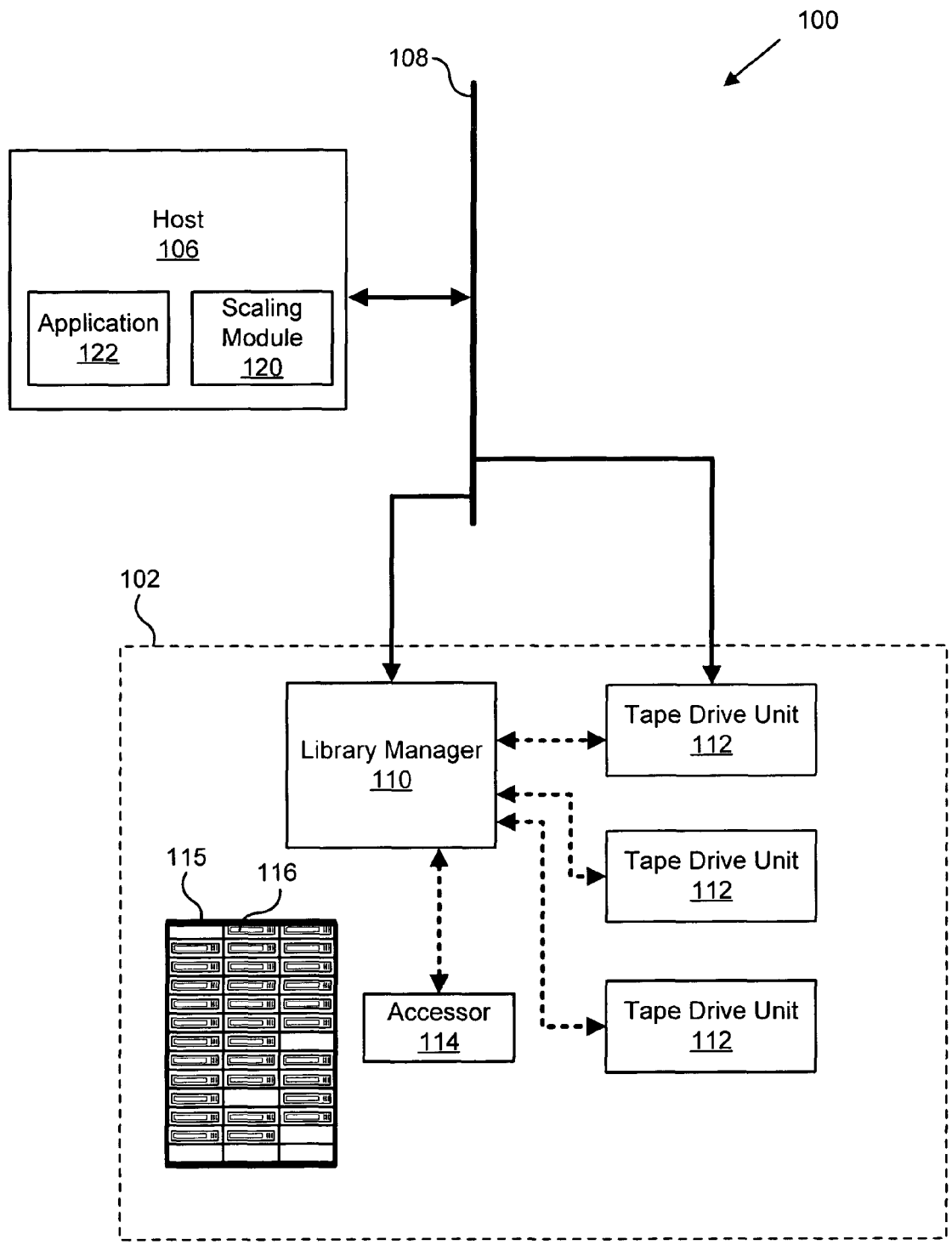
FIG. 1 is a schematic block diagram illustrating one embodiment of a computing environment in accordance with the present invention.

FIG. 1 depicts a schematic block diagram of one embodiment of a computing environment 100 that may be employed in accordance with the present invention. The computing environment 100 shown includes an automated tape library unit 102, and at least one host 106. The host 106 may be a mainframe computer. Alternatively, the host 106 may be a server or personal computer using one of a variety of operating systems. The host 106 and the tape library unit 102 may be connected via a storage area network (SAN) or similar communication channel 108. The communication channel 108, in one embodiment, may be a FICON or ESCON.

The illustrated automated tape library unit 102 includes a library manager 110, one or more tape drive units 112, an accessor 114, and a plurality of tape storage media cartridges 116. The plurality of tape storage cartridges 116 may be stored in one or more media cartridge storage bins 115. In an alternate embodiment, the host 106 may be coupled directly to the tape storage drive 112.

The library manager 110, which may include a computing processor (not shown), is interconnected with and controls the actions of the tape drive units 112 and the accessor 114. The library manager 110 also may include one or more hard disk drives (not shown) for memory storage, as well as, a control panel or keyboard (not shown) to provide user input. In one embodiment, the library manager 110 may comprise a storage controller configured to communicate with the host. The control panel may be, in one embodiment, a computer in communication with the library manager 110 so that a user can control the operating parameters of the automated tape library unit 102 independently of the host 106.

The accessor 114 may be a robotic arm or other mechanical device configured to transport the selected tape storage cartridges 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 112. In alternative embodiments, the tape drive units 112 may be replaced by optical disk drives or other magnetic drives. Similarly, the tape storage cartridges 116 may be replaced by other storage media cartridges utilizing magnetic media, optical media, or any other removable media corresponding to the type of drive employed.

In FIG. 1, three tape drive units 112 are shown. The present invention is operable with one or any larger number of tape drive units 112. The tape drive units 112 may share one single repository of tape storage cartridges 116. Alternatively, the tape drive units 112 may independently correspond to and utilize multiple repositories of tape storage cartridges 116. The tape drive units 112 may advantageously be distributed over multiple locations to decrease the probability that multiple tape drive units 112 will be incapacitated by a disaster in one location. Additionally, the tape drive units 112 may be configured to be operational without the automated tape library unit 102.

The interconnections between the library manager 110, the tape drive units 112, and the accessor 114 are shown as dashed lines to indicate that the depicted library manager 110 transmits and receives control signals to the tape drive units 112 and the accessor 114. Data for storage or retrieval may be transmitted directly between the host 106 and the tape drive units 112 via a network 118, which may be a storage area network (SAN), a local area network (LAN), a wide area network (WAN), FICON, ESCON, or a different type of network, such as the Internet, a wireless, or a direct connection between the storage manager 104 and the tape drive devices 112. Consequently, the host 106, and automated tape library unit 102 may all communicate using the communication channel 108.

Conventionally, tape storage cartridges 116 are configured with a predefined capacity, that may be less than or equal to the maximum capacity of the tape storage cartridges 116. In one embodiment, this predefined capacity is configured to greatly increase data access performance. The predefined capacity is typically determined by the tape storage manufacturer, and is the capacity that optimizes both storage capacity and data access performance. Typically, this predefined capacity varies between different types of tapes which use older and more recent storage technology. The increase in data access performance is achieved by scaling or logically limiting the capacity of the tape storage cartridge 116. By limiting the capacity of the tape storage cartridge the distance of tape which must be traversed is reduced, thereby decreasing the time that is required to access the data. In one embodiment, the system 100 may include a scaling module 120 configured to select a storage command that may utilize this scaling capability of the tape storage cartridge 116.

Figure 2:
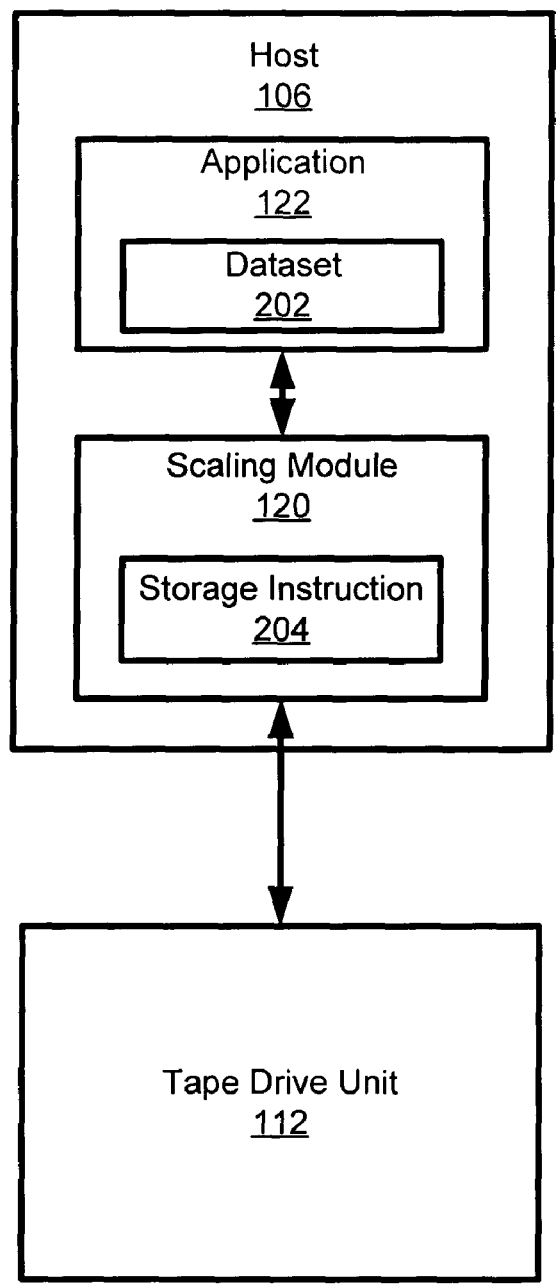
FIG. 2 is a logical block diagram illustrating one embodiment of an apparatus for selecting storage medium scaling to improve data access performance in accordance with the present invention.

FIG. 2 is a logical block diagram illustrating one embodiment of the present invention. The arrows of FIG. 2 represent the flow of data from an application 122 through the scaling module 120 to the tape drive unit 112. As mentioned above, typically applications 122 produce datasets 202 associated with the tasks being performed. Certain applications 122 produce datasets 202 of real-time mission critical information while other applications 122 include datasets 202 pertaining to more static information such as demographic or backup information.

The datasets 202 may contain various kinds of data and include various storage requirements. These storage requirements are characterized by storage characteristics of the dataset 202. The storage characteristics are preferably defined by the application 122 and may relate to both the type of data as well as the purpose of the application 122. Examples of storage characteristics include, but are not limited to, compaction, media interchange specifications, and expiration dates.

Conventionally, the host 106 communicates the datasets 202 and a storage instruction to the tape drive unit 112. The tape drive unit 112 executes the storage instruction to store the datasets 202 in a manner consistent with the storage characteristics. Typically, the storage instruction may comprise a data class software object with accompanying attributes and methods. Unfortunately, conventional systems are not configured to select a storage instruction that specifies whether or not to scale the storage medium. Furthermore, the conventional storage instruction does not direct the tape drive unit 112 to scale to an optimal performance point.

Typically, a storage instruction 204 comprises an instruction predefined by a user or system administrator. The system administrator identifies datasets 202 within his/her computing environment 100 that will benefit from storage on scaled tape storage cartridges 116. The system administrator defines specific storage instructions 204 that will cause these datasets 202 to be stored on scaled tape storage cartridges 116. Similarly, the system administrator may define storage instructions 204 that will cause datasets 202 to be stored on full capacity tape storage cartridges 116. The system administrator saves the storage instruction 204 as predefined storage instructions 204. These predefined storage instructions 204 may be selected by a scaling module 120 receiving the datasets 202. Alternatively, the scaling module 120 may generate the storage instruction 204 as needed.

In one embodiment, the scaling module 120 may receive a dataset 202 from the application 122. Upon receiving the dataset 202, the scaling module 120 may communicate a storage instruction 204 to the tape drive unit 112. In one embodiment, the storage instruction 204 may comprise an instruction to scale the tape storage cartridge 116. Alternatively, the storage instruction 204 may comprise an instruction to not scale the tape storage cartridge 116, using the full capacity of the tape storage cartridge 116. The process by which the scaling module 120 selects the storage instruction 204 will be discussed below in greater detail with reference to FIG. 3.

Figure 3:
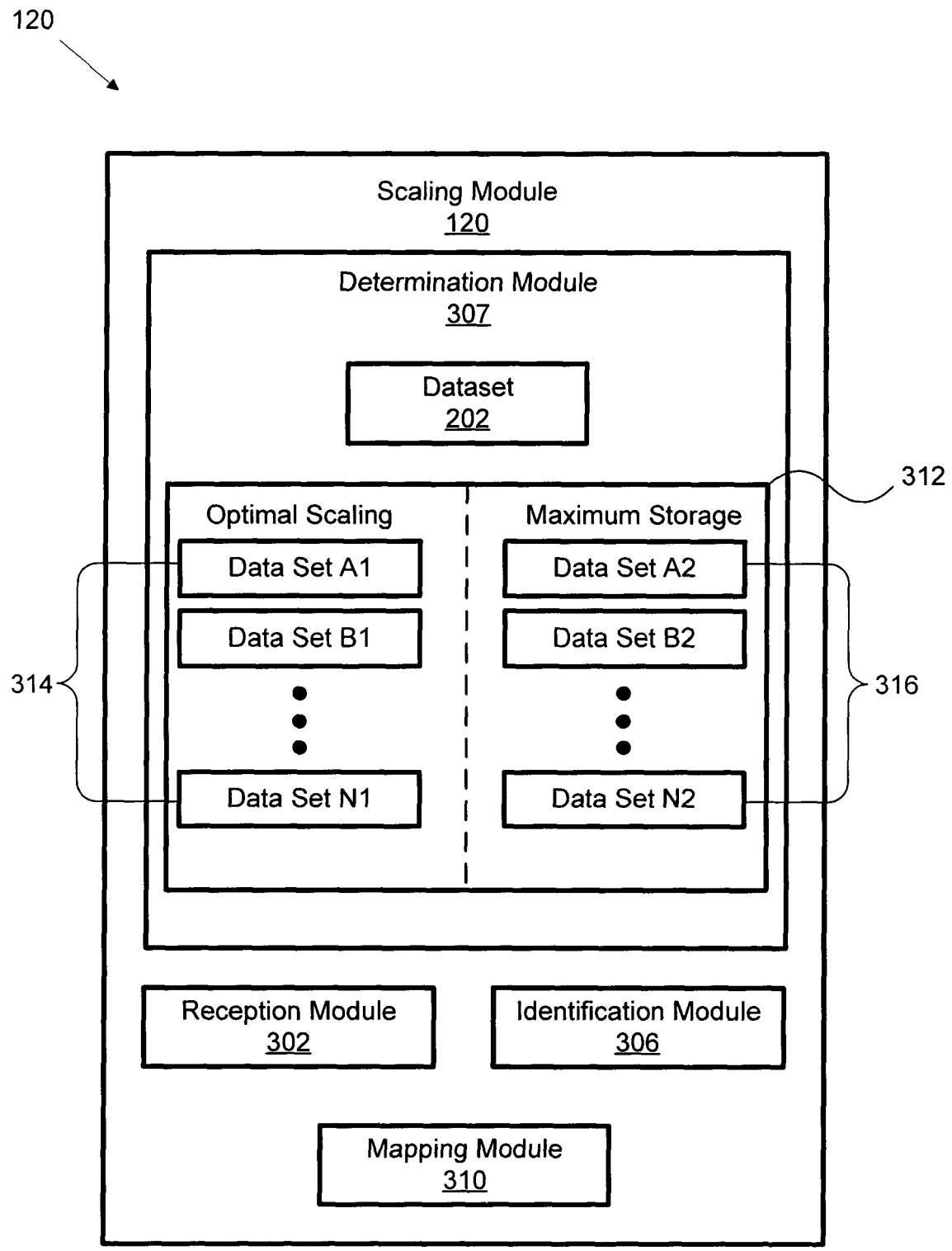
FIG. 3 is a schematic block diagram illustrating one embodiment of a scaling module in accordance with the present invention.

In FIG. 3, is a schematic block diagram illustrates one embodiment of a scaling module 120 of the present invention. The scaling module 120 may comprise a reception module 302, an identification module 306, a determination module 307, and a mapping module 310. In one embodiment, the reception module 302 operates within the scaling module 120. Furthermore, the reception module 302 may communicate with the application 122 and receive the dataset 202. For example, the application 122 sends the dataset 202 in the form of a software object to the reception module 302. Alternatively, the reception module 302 may read the dataset 202 from a file or other data structure.

Typically, a plurality of applications 122 operate within the host 106. Each application 122 may store datasets 202 on tape storage cartridges 116. Each dataset 202 may be application 122 specific. Additionally, one application 122 may utilize a plurality of datasets 202.

Depending upon the type of dataset 202, an application 122 obtains improved data access performance by storing the dataset 202 on a scaled tape storage cartridge 116. Alternatively, the application 122 may benefit from dataset storage on a non-scaled tape storage cartridge 116. For example, data that benefits from storage on a scaled tape storage cartridge may be data such as banking transactions that are frequently accessed. In contrast, data such as backup data benefits from storage on a full capacity tape storage cartridge 116 because backup data is accessed infrequently. One advantage of the present invention is the ability to modify the storage criteria 312 such that datasets 202 from applications 122 that would benefit from scaling tape storage cartridges 116 may utilize this feature without changing the programming of the application 122.

In one embodiment, the identification module 306 may identify storage characteristics of the dataset 202. For example, the identification module 306 may be configured to identify the class of the dataset 202. Alternatively, the identification module 306 may identify one or more storage characteristics that indicate storage on a scaled tape storage cartridge 116 is beneficial. For example, one attribute of the dataset 202 may specify whether or not to use a scaled tape storage cartridge 116.

Once identified, the dataset 202 is passed to the determination module 307. In one embodiment, the determination module 307 may comprise storage criteria 312. The storage criteria 312 may comprise a predefined lookup table containing a plurality of datasets 314, 316 that determine whether the received dataset 202 is to be stored on an optimally scaled tape storage cartridge 116, or a full capacity tape storage cartridge 116.

Alternatively, the storage criteria 312 may comprise predefined conditional logic that determines the most advantageous tape storage cartridge 116 for the dataset 202. For example, a computing environment 100 administrator may define in the storage criteria 312 a series of conditional, computer executable commands. The determination module 307 may analyze the dataset 202 and determine based on the storage criteria 312 whether the dataset 202 should be optimally scaled or use full capacity tape storage cartridges 116.

Additionally, the determination module 307 may select the storage instruction 204 from a predefined set of storage instructions 204. These sets of storage instructions 204 may comprise software objects in which one or more attributes are set to scale the tape medium 116. In one embodiment, the determination module 307 may select the storage instruction 204 based on a single storage characteristic such as a scale attribute of the dataset 202. In another embodiment, the determination module 304 may use a combination of storage characteristics and predefined storage criteria 312 to determine which storage instruction 204 to select.

In a further embodiment, the determination module 307 generates the storage instruction 204. As mentioned above, the storage criteria 312 and one or more storage characteristics may be used to determine whether or not to scale the tape storage cartridge 116. However, instead of selecting from predefined storage instruction 204, the determination module 307 may generate the appropriate storage instruction 204.

In one embodiment, the mapping module 310 may be configured to track the use of the tape storage cartridge 116 and monitor the usable capacity of the tape storage cartridge 116 for datasets 202 that are stored on a scaled tape medium 116. The mapping module 310 may communicate the usable capacity to the application 122 as necessary.

Figure 4:
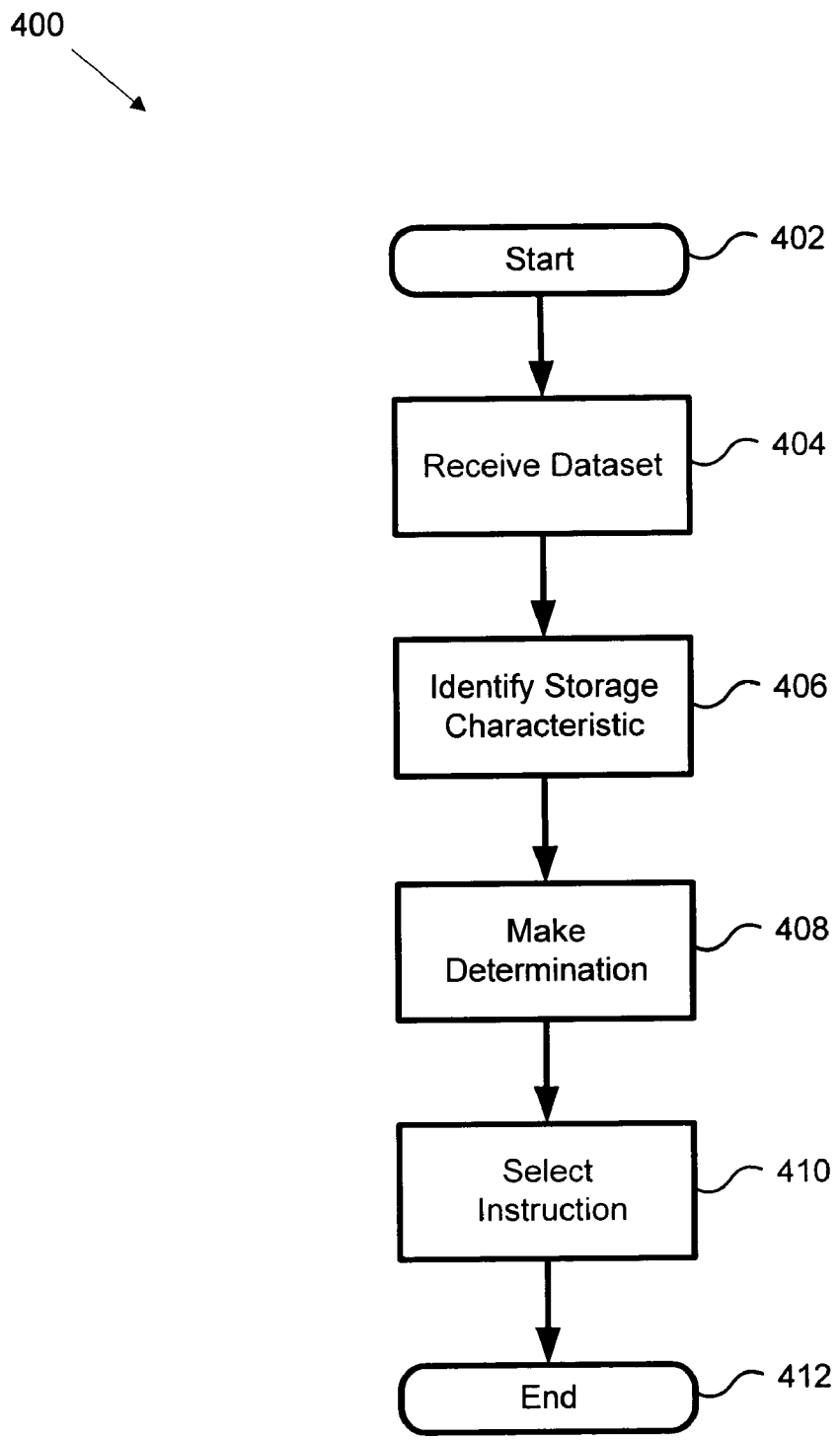
FIG. 4 is a schematic flow chart diagram illustrating one embodiment of a scaling method in accordance with the present invention.

FIG. 4 is a schematic flow chart diagram illustrating one embodiment of a method 400 for scaling tape storage devices to improve data access performance. The method 400 starts 402 when a reception module 302 receives 404 a dataset 202. An identification module 306 then identifies 406 the storage characteristics of the dataset 202. A determination module 304 may then make 408 a determination whether to select 410 a storage instruction 204 for scaling or not scaling a tape storage cartridge 116 and the method 400 ends 412.

Figure 5:
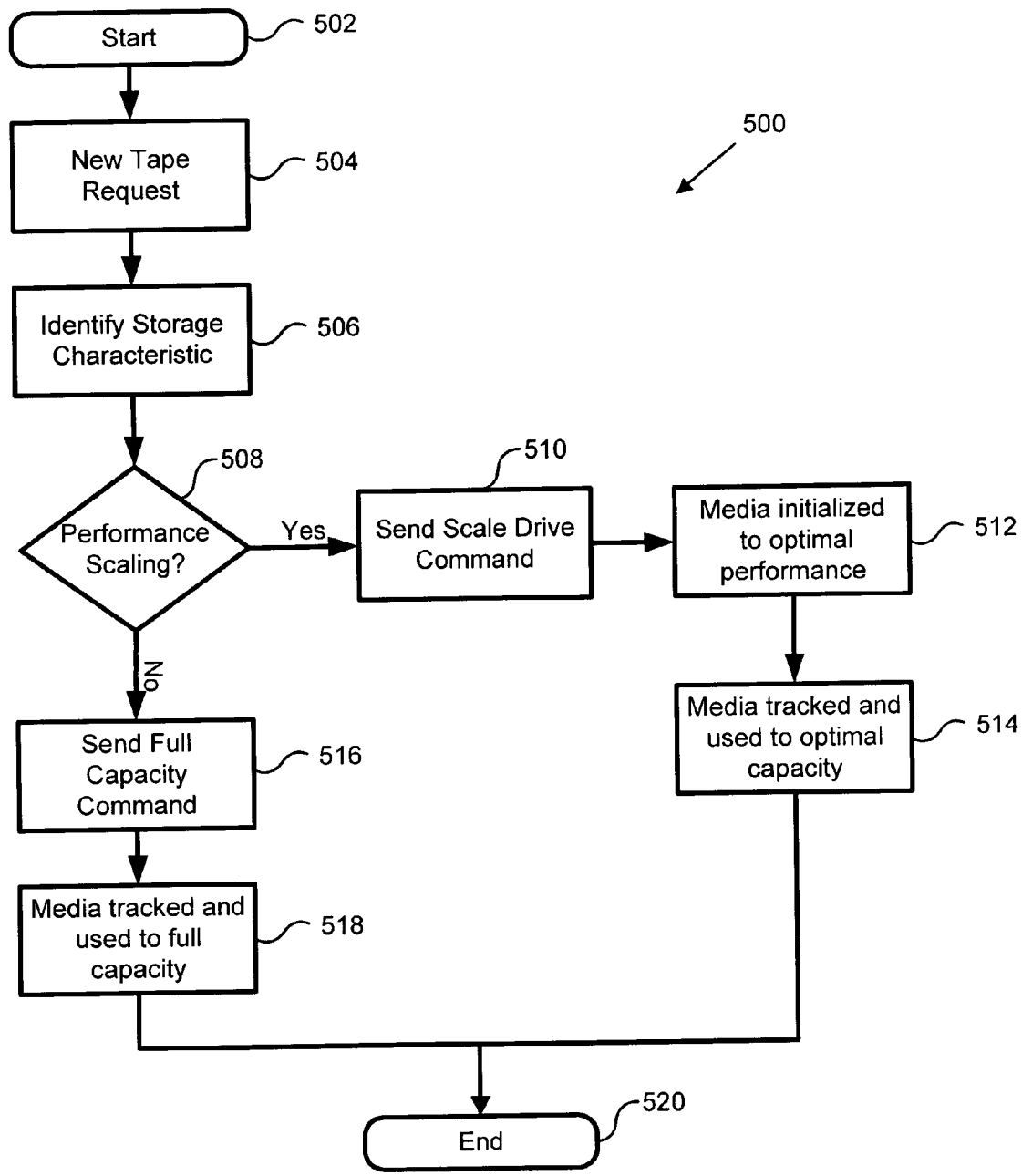
FIG. 5 is a schematic flow chart diagram illustrating an alternative embodiment of a scaling method in accordance with the present invention.

FIG. 5 is a schematic flow chart diagram illustrating a further embodiment of a scaling method 500 for selecting the predefined optimal performance capacity of the tape storage cartridge 116. The method 500 begins 502 and a user sends 504 a new tape dataset request to a host 106. A reception module 302 receives the dataset 202, and an identification module 306 identifies 506 the storage characteristics of the dataset 202. A determination module 304 then compares the storage characteristics of the received dataset 202 with the user-defined storage criteria 312 to make 508 a determination whether or not to scale the tape storage cartridge 116. If the storage characteristics satisfy certain storage criteria for optimal performance scaling, then a scale drive storage instruction 204 is sent to the tape drive unit 112. The tape drive unit 112 receives the storage instruction 204 and a tape storage cartridge 116 is initialized 512 for optimal performance. The mapping module 310 may then track 514 and utilize the scaled tape storage cartridge 116, and the method 500 ends 520.

If the storage characteristics do not satisfy certain storage criteria for optimal performance scaling, the determination module 307 sends 516 a storage instruction 204 to not scale the tape storage cartridge 116. The tape storage unit 112 receives the request and a tape storage cartridge 116 is initialized to full capacity. The mapping module 310 may then track 514 and utilize the full capacity tape storage cartridge 116. Preferably, the mapping module 310 maintains capacity information for the tape cartridge 116. The mapping module 310 may communicate this capacity information to the application 122 as needed, and the method 500 ends 520.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for selecting storage media scaling to improve data access performance, the apparatus comprising:
a processor coupled to a memory;
a reception module implemented in software stored on a memory device for execution on a processor and configured to receive a dataset for storage on a magnetic tape storage medium with a storage instruction that does riot direct that the dataset is stored with scaling;
an identification module implemented in software stored on the memory device for execution on the processor and configured to identify storage characteristics of the dataset, wherein the storage characteristics comprise compaction, expiration dates, and media interchange specifications; and
a scaling module implemented in software stored on the memory device for execution on the processor and configured to select a scaling storage instruction using a pre-defined look-up table that determines whether each dataset is to be scaled using the scaling instruction and communicate the selected scaling storage instruction to a storage controller, wherein the scaling storage instruction comprises an instruction to scale the magnetic tape storage medium to a predefined capacity for optimal data access performance and the storage controller stores the dataset on a magnetic tape storage device in response to the scaling storage instruction.

2. The apparatus of claim 1, further comprising a determination module implemented in software stored on the memory device for execution on the processor and configured to store a plurality of predefined storage criteria and compare the storage characteristics of the received dataset with the predefined storage criteria to determine the storage instruction.

3. The apparatus of claim 1, further comprising a mapping module implemented in software stored on the memory device for execution on the processor and configured to track capacity information for the magnetic tape storage medium that stores the dataset.

4. A system for scaling a storage medium to improve data access performance, the system comprising:
a network configured to communicate data;
a storage controller coupled to the network;
a magnetic tape storage device having a magnetic tape storage medium configured to store data received from the controller over the network;
a host coupled to the network, the host configured to exchange data with the controller;
an application operating within the host, the application configured to produce a dataset to be stored on the magnetic tape storage medium with a storage instruction that does not direct that the dataset is stored with scaling;
an identification module implemented in software for execution on a processor and configured to identify storage characteristics of the dataset that indicate scaling is beneficial, wherein the storage characteristics comprise compaction, expiration dates, and media interchange specifications; and
a scaling module configured to communicate with the application and select a scaling storage instruction using a pre-defined look-up table that determines whether the received dataset is to be scaled using the scaling instruction and communicate the selected scaling storage instruction to the storage controller, wherein the scaling storage instruction comprises an instruction to scale the magnetic tape storage medium to a predefined capacity for optimal data access performance, and the storage controller stores the dataset on the magnetic tape storage device in response to the scaling storage instruction.

5. The system of claim 4, wherein the scaling module is configured to store a plurality of predefined storage criteria and compare the storage characteristics of the dataset with the predefined storage criteria to determine the storage instruction.

6. The system of claim 4, wherein the scaling module operates within the host.

7. The system of claim 4, wherein the scaling module operates within the storage controller.

8. The system of claim 4, wherein the scaling module operates within the magnetic tape storage device.

9. The system of claim 4, the system further comprising an accessor configured as a robotic arm with a cartridge gripper and a bar code scanner mounted on the cartridge gripper, wherein the accessor transports the magnetic tape storage medium to the magnetic tape storage device.

10. A computer readable storage medium comprising computer readable code configured to carry out a method for selecting storage medium scaling to improve data access performance, the method comprising:
receiving a dataset to be stored on a magnetic tape storage medium with a storage instruction that does not direct that the dataset is stored with scaling;
identifying storage characteristics of the dataset, wherein the storage characteristics comprise compaction, expiration dates, and media interchange specifications;
determining using a pre-defined look-up table whether the received dataset is to be scaled using a scaling instruction; and
selecting the scaling instruction to scale the magnetic tape storage medium to a predefined capacity for optimal data access performance according to the determination, wherein a storage controller stores the dataset on a magnetic tape storage device in response to the scaling instruction.

11. The computer readable storage medium of claim 10, wherein the method further comprises defining a plurality of storage characteristics as storage characteristics that require storage on optimally scaled magnetic tape storage medium.

12. The computer readable storage medium of claim 10, wherein the method further comprises defining a plurality of storage characteristics as storage characteristics that require storage on maximum capacity magnetic tape storage medium.

13. The computer readable storage medium of claim 10, wherein determining further comprises identifying storage characteristics that satisfy storage criteria for storing the dataset on optimally scaled magnetic tape storage medium.

14. The computer readable storage medium of claim 10, wherein determining further comprises identifying storage characteristics that satisfy storage criteria for storing the dataset on maximum capacity magnetic tape storage medium.

15. The computer readable storage medium of claim 10, wherein the method further comprises tracking capacity information for the magnetic tape storage medium that stores the dataset.

* * * * *